United States Patent [19]

Bazarian et al.

[11] 4,084,208

[45] Apr. 11, 1978

[54] GAS-FILLED SURGE ARRESTORS

[75] Inventors: A. Bazarian, Colts Neck; J. S. Bonnesen, Randolph, both of N.J.

[73] Assignee: General Instrument Corporation, Clifton, N.J.

[21] Appl. No.: 562,835

[22] Filed: Mar. 28, 1975

[51] Int. Cl.[2] .............................................. H02H 3/22

[52] U.S. Cl. ..................... 361/120; 313/308; 361/129 313/244; 313/291

[58] Field of Search ........................ 317/62, 61, 67, 68; 313/221, 291, 244, 308; 315/35

[56] References Cited

U.S. PATENT DOCUMENTS

| | | | |
|---|---|---|---|
| 1,860,210 | 5/1932 | Spawner et al. | 317/62 X |
| 2,508,118 | 5/1950 | Lemmers | 313/291 X |
| 2,733,371 | 1/1956 | Campbell | 313/291 X |
| 2,914,695 | 11/1959 | Meyer, Jr. et al. | 313/244 X |
| 3,209,197 | 9/1965 | Ashmann et al. | 313/221 |
| 3,454,811 | 7/1969 | Scudner, Jr. | 317/62 X |
| 3,588,576 | 6/1971 | Kawiecki | 317/61 X |
| 3,845,343 | 10/1974 | Hammer | 313/221 |
| 3,876,894 | 4/1975 | Peche | 361/120 X |
| 3,979,646 | 9/1976 | Peche et al. | 361/120 |
| 3,989,985 | 11/1976 | Lange et al. | 361/120 |

*Primary Examiner*—Patrick R. Salce
*Attorney, Agent, or Firm*—James & Franklin

[57] ABSTRACT

A surge arrestor is provided having two electrodes attached at opposite ends of an insulator tube. Portions of the respective electrodes extend toward each other to define a gap therebetween. At least one conductor is attached to the inner surface of the tube in the vicinity of the gap. The conductor is completely separated from the electrodes and covers a substantial portion of the inner surface of the tube.

11 Claims, 3 Drawing Figures

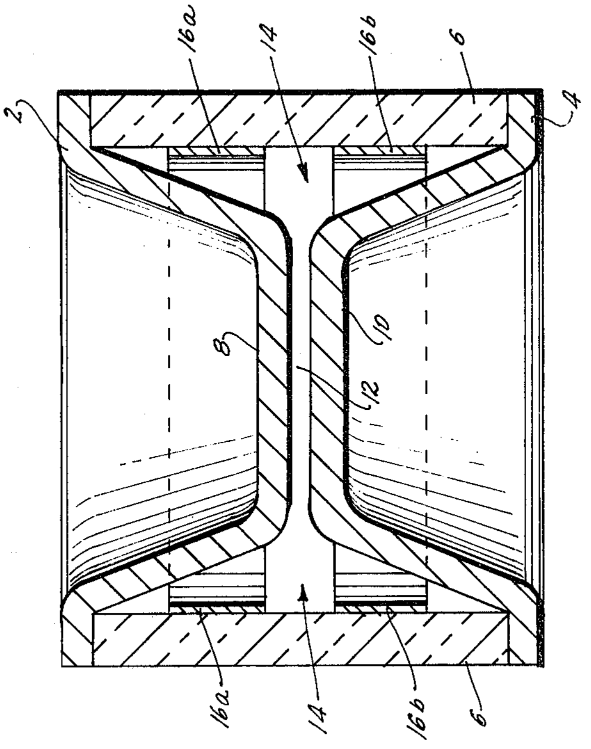
FIG. 2
FIG. 3
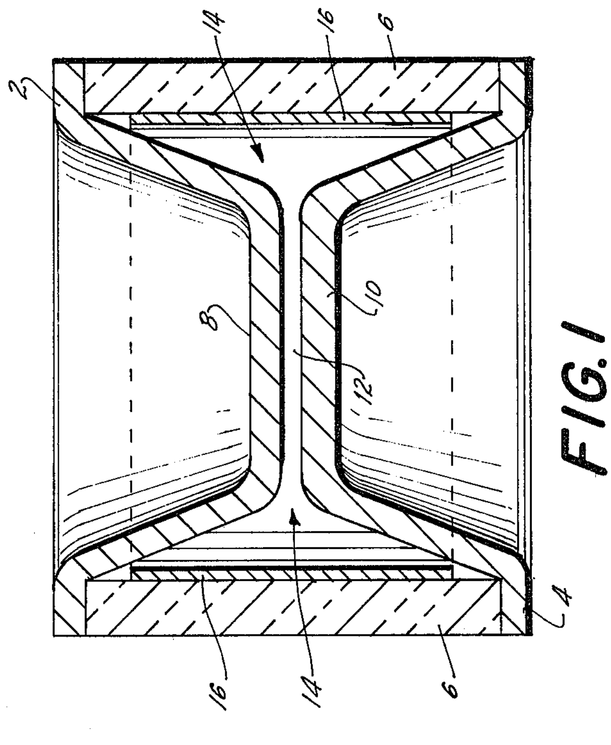
FIG. 1
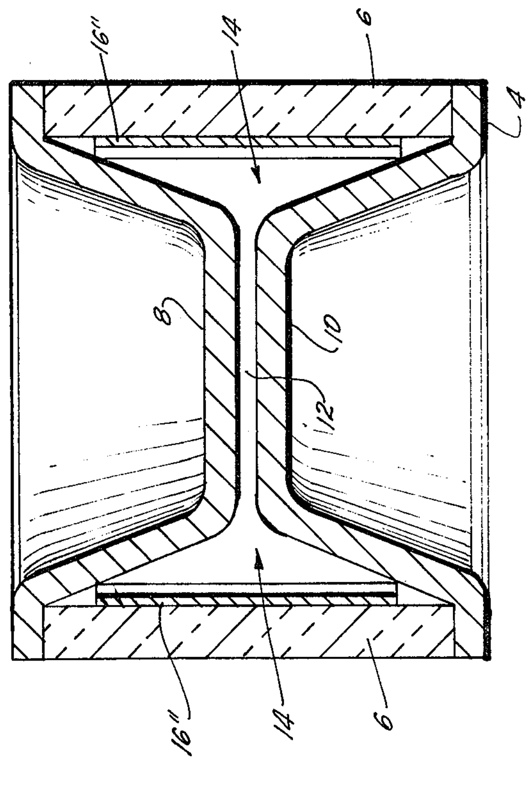

GAS-FILLED SURGE ARRESTORS

The present invention relates generally to a device for limiting the voltage applied to an electric circuit, and more particularly to an improved surge arrestor having a faster response time.

In many uses of electric circuits, undesirable increases in the voltage supplied to the circuit can occur which pose a serious hazard to the continued normal operation of the circuit. To deal with such a situation, a voltage limiting device is conventionally inserted into the circuit. Such a device is in a very high impedance condition when the voltage is at an acceptable level but switches into a low impedance condition when it senses an over-voltage in order to arrest, or divert, the voltage and prevent it from reaching the circuit. Typically, such a device is comprised of two electrodes having respective portions separated by a gap which is filled with gas. The device is connected across or in parallel with the circuit that is being protected. Under normal conditions, no current exists between the electrodes since they are not in contact. However, at a particular voltage, known as the breakdown voltage, the device switches to its low impedance state. The breakdown voltage is designed to be below the voltage which the circuit can safely withstand.

The primary deficiency of the conventional device is its inability to satisfactorily respond to a rapidly rising voltage impulse, or surge. The breakdown voltage is preset to a particular value by such factors as the shape of the electrodes, width of the gap, and pressure of the gas, and the device does indeed switch at this voltage for slow-rising voltages. The switching action in such a case is adequate to protect the circuit because the response time of the device relative to the rise time of the voltage is fast enough to cause its switching before the voltage can rise significantly above the breakdown voltage. However, this response time is too slow in relation to the fast rise time of a surge. Consequently, by the time the device switches, the surge voltage transmitted to the circuit has had the opportunity to reach an undesirably high level and possibly cause damage. Generally, the faster the rise time of the voltage surge the higher will be the voltage reached before switching action can occur. Thus, damage to the circuit can occur despite usage of the device.

It is, therefore, the primary object of the present invention to provide a circuit protection device having an improved response time.

It is another object of the present invention to provide a circuit protection device that is reliable and economical to manufacture.

In accordance with these objects, a surge arrestor is provided having two electrodes attached at opposite ends of an insulator tube which is filled with a gas. The electrodes have respective portions extending toward each other and separated by a gap therebetween. At least one conductor is attached to the inner surface of the tube in the vicinity of the gap. The conductor is completely separated from the electrodes and covers a substantial portion of the inner surface of the tube.

To the accomplishment of the above and to such other objects as may hereinafter appear, the present invention relates to the construction of a gas-filled surge arrestor, as defined in the appended claims and as described in this specification, taken together with the accompanying drawings, in which:

FIG. 1 shows an elevational cross-section of one embodiment of the invention;

FIG. 2 shows an elevational cross-section of another embodiment of the invention; and FIG. 3 shows an elevational cross-section of still another embodiment of the invention.

The present invention is illustrated with a conventional voltage-responsive circuit-protective device shown in all the drawings to be comprised of electrodes 2 and 4 attached at opposite ends of an insulator tube 6. Electrodes 2 and 4 have respective tapered central portions 8 and 10 extending toward each other to define a gap 12 therebetween. Tube 6 and electrodes 2 and 4 form a space 14, of which gap 12 is a part, into which an appropriate gas is introduced. Space 14 is made air-tight by virtue of a conventional joint between electrodes 2, 4, respectively, and tube 6 to keep the gas from leaking out.

In operation, the device A is connected across or in parallel with the circuit it is to protect. Under normal conditions, i.e., when the supply voltage is below the breakdown voltage, no current flows between electrodes 2 and 4 due to gap 12 separating them and, thus, the circuit operation is not affected by the presence of the device. However, when the voltage reaches the designed breakdown voltage of the device, due to inductive surges or lightning discharges, for example, the gas between electrodes 2 and 4 will ionize. After the initial ionization, arc discharge current will flow between the electrodes 2 and 4 as long as the transient voltage persists. As soon as the transient voltage has passed current flow between electrodes 2 and 4 ceases and normal circuit operation is resumed.

The conventional device described above switches satisfactorily at the designed breakdown voltage in response to a slow-rising voltage. However, a surge is transmitted to the circuit even at levels considerably above the designed breakdown voltage because the response time of the device is too slow to prevent it, as discussed above. In fact, the impulse ratio — the ratio of surge breakdown voltage to the designed breakdown voltage — can be as high as 5:1. Since surges are common in a variety of usages, the possibility of damage to the circuitry due to high voltages which the device fails to arrest is considerable.

To lower the impulse ratio, the response time must be improved. To this end, the first embodiment of the present invention is shown in FIG. 1 to be comprised of an electrically conductive annular band 16 attached to the inner surface of tube 6. Band 16 is positioned in a spaced relationship to electrodes 2 and 4. No part of band 16 is in contact with any part of electrodes 2 and 4, respectively. Since the device is preferably symmetrical, band 16 is centered in relation to gap 12 so that the center of the gap is aligned with the center of the band. Consequently, the separations between conductor 16 and electrodes 2 and 4, respectively, are approximately the same and equal from 5% to 25% of the length of tube 6. Stated another way, the width of band 16 covers 50% to 90% of the length of tube 6. It has been experimentally determined that better impulse ratios are obtained with the latter width, i.e., with a small gap between electrodes 2 and 4, respectively, and conductor 16.

FIG. 2 shows the same basic device, with like components being numbered exactly as in FIG. 1. Two electrically conductive bands $16_a$ and $16_b$ are attached to the inside surface of tube 6. Bands $16_a$ and $16_b$ are spaced from each other as well as from electrodes 2 and 4. Neither band is in contact with any other conductive component. Since the device is preferably symmetrical, bands $16_a$ and $16_b$ are equidistantly spaced from gap 12 as well as from their respective adjacent electrode. The width of the spacings between bands $16_a$ and $16_b$ as well as between the respective bands and their adjacent electrode are not critical though it has been experimentally determined that the latter spacing has a more pronounced effect on the impulse ratio than the former. More specifically, the smaller the spacing between the respective bands $16_a$ and $16_b$ and their adjacent electrode the lower the impulse ratio. The width of bands $16_a$ and $16_b$ is also not critical though they should together comprise a substantial portion of the length of tube 6.

The third embodiment in FIG. 3 is also illustrated with the above-described conventional device. Two bands 16' and 16" are attached to and extend lengthwise of tube 6 rather than extending circumferentially, as with the previous embodiments. Bands 16' and 16" are spaced circumferentially from each other along the inner surface of tube 6. Each of bands 16' and 16" is also spaced from both electrodes 2 and 4. Thus, neither band touches any other conductive component. The precise length of the bands is not critical but preferably it is about 75% of the length of tube 6. Since device A is preferably symmetrical, bands 16' and 16" will be centered around gap 12 so that the spaces between respective bands 16' and 16" and their adjacent electrode are equal. The width of bands 16' and 16" around the circumference of tube 6 is also not critical and can be anywhere from 1/20th to slightly less than ½ of the circumference of the inner surface of tube 6. The circumferential centers of the respective bands 16' and 16" are preferably separated by 180°.

Our invention has significantly reduced the impulse ratio from 5:1 to less than 2:1. The exact theoretical explanation for this improved performance is not clear. However, a possible explanation is that the introduction of a conductor into space 14 that is completely spaced from electrodes 2 and 4 and covers a substantial portion of the inner surface of tube 6 significantly alters the electric field within space 14. As a result, the number of charged particles in the gas within gap 12 is altered in such a way as to decrease the amount of time required for an avalanche to occur in the gas so that a spark can be more quickly transmitted from portion 8 of electrode 2 to portion 10 of electrode 4 across gap 12.

The structure of our invention provides several advantageous features in addition to the improved response time. First, because the various conductive bands are spaced from the electrodes, "sputtering" of conductive material onto the inside surface of the tube will not short out the electrodes. "Sputtering" refers to the deposit of material discharged from the electrodes during sparking which, after a number of discharges, produces a ring around gap 12. Since the separation between the various conductors of the three disclosed embodiments and both electrodes is at a significant distance from the gap 12, it is highly unlikely that a conductor will come into electrical contact with an electrode. Second, the various bands, and in particular the solid bands, are easy to apply during production especially in view of the fact that precise location with respect to the electrodes is not critical. Third, because various conductive bands cover a substantial portion of the inner surface of the insulator, the difference in the operation of the device in light and darkness is reduced. With ceramic being the conventionally used insulator for tube 6, the wall thickness normally used is not opaque to ultra-violet radiation. Pulse voltage response is affected by such radiation. This effect is, of course, minimized by the use of conductive bands which are opaque to radiation.

The various conductive bands may be made of various materials such as, for example, graphite or carbon deposited by abrasion or a metal film deposited by one of several high temperature metalizing processes. Likewise, it may also be a low temperature fired silver coating. The thickness will vary depending on the type of coating and may vary between $10^{-5}$ inch to $10^{-3}$ inch.

The joints between tube 6 and electrodes 2 and 4, respectively, can be made secure and air-tight in any one of several well-known ways, such as by brazing.

It will be apparent from the foregoing that the advantages of the present invention are achieved by placing at least one conductor in the vicinity of the gap between the electrodes in a conventional gas-filled surge arrestor. The conductor is completely spaced from both electrodes. Such a configuration is highly versatile and the impulse ratio of many types of spark-gap devices of various geometrical shapes and constructions can be improved by placing such a conductor in the vicinity of the gap.

While but three embodiments of the present invention have been here specifically disclosed, it will be apparent that many variations may be made therein all within the scope of the instant invention as defined in the following claims.

We claim:

1. In a surge arrestor having two electrodes separated from each other by, and secured within an insulator tube having a substantially cylindrical interior cavity, said tube and electrodes defining a closed interior space, said electrodes comprising rear portions secured to said tube, intermediate portions extending toward one another, each of said intermediate portions having a continuously tapered surface substantially in the form of the surface of a conical section, such that the distance between the wall of said cavity and said surface varies along the length of said intermediate portion, and front portions laterally spaced from said tube and spaced from one another to define a gap therebetween, and a gas filling the space between said elctrodes within said tube, the improvement comprising;

at least one conductor attached to the inner surface of said tube, completely spaced from said electrodes, and having axial edges exposed to said interior space adjacent said electrodes but relatively remote from said gap, wherein said at least one conductor is comprised of two circumferentially spaced conductors with each extending from most of the length of said tube and around a portion of the circumference of said tube.

2. The device of claim 1, wherein the conductors are substantially centered about said gap in the axial direction of said tube.

3. The device of claim 1, wherein the respective circumferential centers of said conductors are approximately 180° apart.

4. The device of claim 3, wherein the conductors are substantially centered about said gap in the axial direction of said tube.

5. In a surge arrestor having two electrodes separated from each other by, and secured to, an insulator tube, said tube and electrodes defining a closed interior space, said electrodes comprising rear portions secured to said tube, intermediate tapered portions extending toward one another, and front portions laterally spaced from said tube and spaced from one another to define a gap therebetween, and a gas filling the space between said electrodes within said tube, the improvement comprising: two axially spaced annular conductor bands attached to the inner surface of said tube, completely spaced from said electrodes, and having axial edges exposed to said interior surface adjacent said electrodes but relatively remote from said gap, said bands covering a portion of the inner circumference of said tube in the vicinity of said gap.

6. The device of claim 5, wherein the spacing between said bands is substantially aligned with said gap.

7. The device of claim 5, wherein said bands are, respectively, substantially equidistantly spaced from said gap.

8. The device of claim 7, wherein the separations at both ends of the tube between the respective bands and their adjacent electrodes are substantially equal.

9. The device of claim 5, wherein said bands are substantially identical.

10. The device of claim 9, wherein said bands are, respectively, substantially equidistantly spaced from said gap.

11. The device of claim 5, wherein the separations at both ends of the tube between the respective bands and their adjacent electrodes are substantially equal.

* * * * *